(12) United States Patent
Koceski et al.

(10) Patent No.: US 11,178,459 B1
(45) Date of Patent: Nov. 16, 2021

(54) NONLINEAR DYNAMIC PRIORITIZED CONTENT CACHING FOR SEGMENTED CONTENT

(71) Applicant: Amazon Technologies, Inc., Seattle, WA (US)

(72) Inventors: Kyle Koceski, Seattle, WA (US); Mairo Pedrini, Shoreline, WA (US); Eyal Safran, London (GB); Paul Nann, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 99 days.

(21) Appl. No.: 16/143,226

(22) Filed: Sep. 26, 2018

(51) Int. Cl.
*H04N 21/472* (2011.01)
*H04N 21/432* (2011.01)
*H04N 21/231* (2011.01)

(52) U.S. Cl.
CPC . *H04N 21/47217* (2013.01); *H04N 21/23106* (2013.01); *H04N 21/4325* (2013.01); *H04N 21/47202* (2013.01)

(58) Field of Classification Search
CPC ......... H04N 21/47217; H04N 21/4325; H04N 21/23106; H04N 21/47202
See application file for complete search history.

(56) References Cited

U.S. PATENT DOCUMENTS

| | | | |
|---|---|---|---|
| 9,615,126 B2* | 4/2017 | Ramamurthy | H04L 65/4084 |
| 2008/0310814 A1* | 12/2008 | Bowra | H04N 21/23406 386/241 |
| 2009/0292819 A1* | 11/2009 | Kandekar | H04N 7/17318 709/231 |
| 2014/0189735 A1* | 7/2014 | Cudak | H04N 21/47217 725/38 |
| 2019/0069006 A1* | 2/2019 | Rachabathuni | H04N 21/8456 |

* cited by examiner

Primary Examiner — Junior O Mendoza
(74) Attorney, Agent, or Firm — Eversheds Sutherland (US) LLP

(57) ABSTRACT

Systems, methods, and computer-readable media are disclosed for providing a nonlinear, dynamic, and prioritized content caching scheme for segmented content during playback. Certain embodiments provide new techniques for optimally determining preferred content, prioritizing the preferred content for download and consumption, and, in systems where storage and memory systems are constrained, utilizing the same prioritization system for optimized garbage collection. Example methods may include determining a current playhead position associated with a video playback. Certain methods include determining a cache priorities for fragments based on the current playhead position and the positions of the fragments in the video playback. A first fragment may be the next fragment with respect to the linear playback, and a second fragment may follow the first fragment. Certain methods include determining that the second cache priority is higher than the first cache priority and providing the second fragment to a user device.

10 Claims, 7 Drawing Sheets

NONLINEAR DYNAMIC PRIORITIZED CONTENT CACHING FOR SEGMENTED CONTENT

BACKGROUND

The digital multimedia revolution has greatly increased the quantity, availability, and distribution of media content. The delivery of media over networks such as the Internet can be accomplished in many ways, including through on-demand video distribution (sometimes referred to as video on demand (VOD) or on-demand viewing) and media streaming (sometimes referred to as live streaming, pseudo-live streaming, or streaming). The exponential proliferation of digital media presents many significant challenges to the multimedia industry.

As the number of unique pieces of digital media content available to consumers continues to grow, there is much effort in industry and academia to provide or improve upon the technologies used to deliver media content to consumers efficiently. In recent years, in order to improve the consumer experience when accessing media content, especially when streaming media data, there has been an attempt to reduce playback latency by caching media content fragments before they are actually needed. In this manner, a playback device (e.g., a media player) may already have access to the fragments at the time those fragments are requested by the playback device.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may encompass, depending on the context, a plural number of such components or elements and vice versa.

DETAILED DESCRIPTION

The popularity of both on-demand viewing and media streaming as methods for media distribution has grown exponentially. This increased popularity has created new problems for media content producers and distributors. One such problem is the latency (e.g., playback jitter) experienced during video playback when a media content fragment requested by a consumer's media device is not available. If the problem persists, or the number of missing or late fragments is large, the viewing experience for the consumer is greatly diminished.

To improve the consumer viewing experience, there has been an attempt to reduce this playback latency by caching media content fragments before they are actually needed by the media player. The selection of which media content fragments to cache, however, is not straightforward. For video playback where there exists multiple different content and each content may be segmented into partial fragments of the content. In some cases, some fragments may be preferred over other fragments at particular times during playback.

A naive system may rely on the linearity of the content to download and cache the fragments linearly with respect to playback. For example, if a consumer is watching a show straight through from the start of the content to the end of the content, the first fragment may be the most preferred initially, the second fragment slightly less preferred, etc., with the last fragment in the content being the least preferred. If there exists multiple different contents which are expected to be played successively (e.g., during a playlist), the fragments of the second content (or third, fourth, etc.) may be less prioritized than the fragments of any preceding contents. While a naive system may help to somewhat reduce latency, such a system is not dynamic, and cannot adjust to accommodate for a nonlinear fragment request. For example, a naive system will struggle when a consumer skips ahead during playback to fragments that are out of the linear playback order.

Embodiments of the disclosure include devices, systems, methods, computer-readable media, techniques, and methodologies for providing a nonlinear, dynamic, and prioritized content caching scheme for segmented content during playback. Certain embodiments provide new techniques for optimally determining preferred content, prioritizing the preferred content for download and consumption, and, in systems where storage and memory systems are constrained, utilizing the same prioritization system for optimized garbage collection. Although described primarily in the context of a video file, aspects of the disclosure may be applied to any form of digital media, including any media content that may be segmented into two or more fragments.

Figure 1:
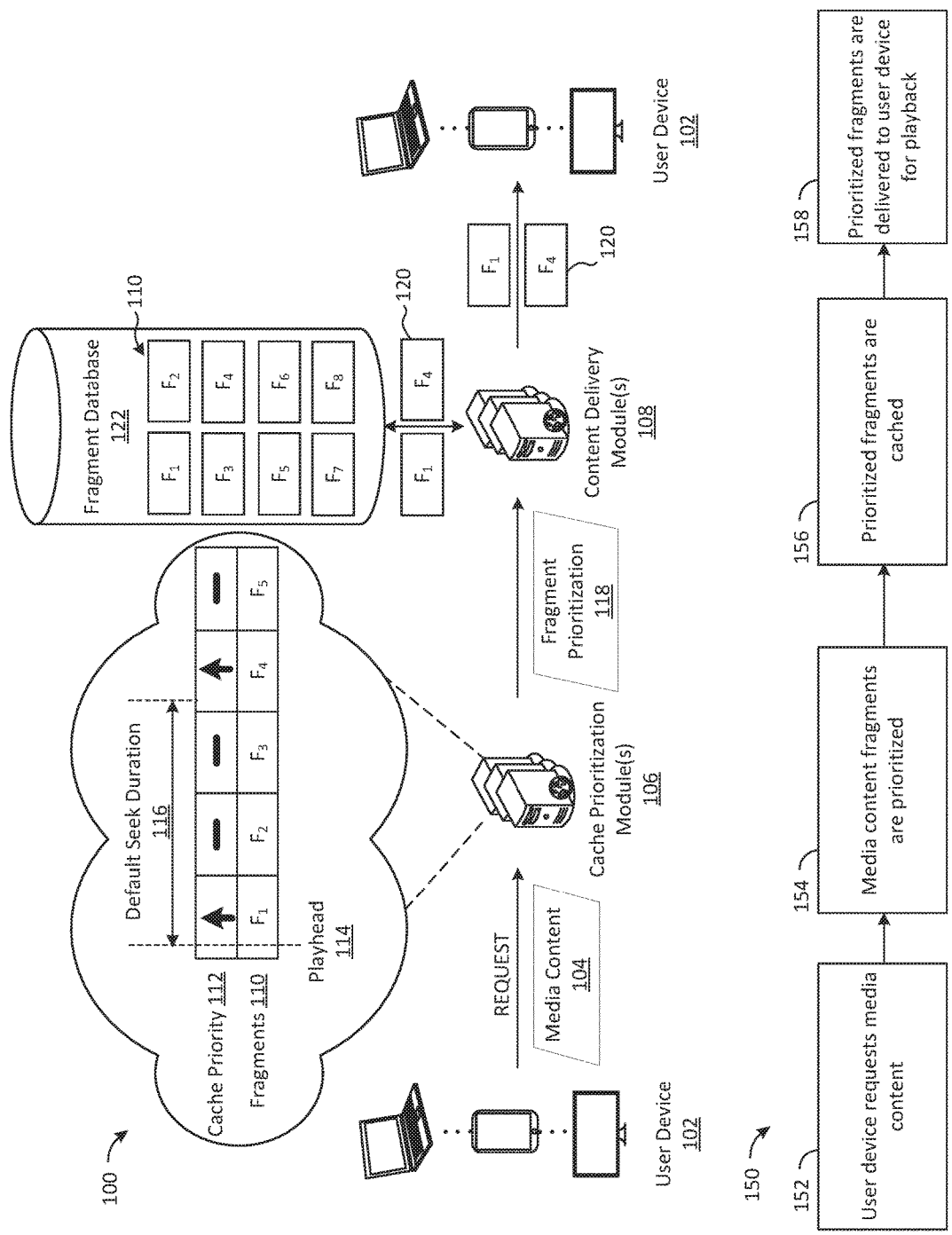
FIG. 1 is a hybrid system and process diagram illustrating a nonlinear, dynamic, and prioritized content caching scheme for segmented content in accordance with one or more example embodiments of the disclosure.

Referring to FIG. 1, an example use case 100 is depicted for providing a nonlinear, dynamic, and prioritized content caching scheme for segmented content in accordance with one or more example embodiments of the disclosure. As illustrated in FIG. 1, a user device 102 may request media content 104. The media content 104 may include, for example, streaming content, a video on demand (VOD), a music video, a movie, a song, or any other type of digital media. The user device 102 may include any suitable processor-driven device including, but not limited to, a mobile device or a non-mobile, e.g., a static, device. For example, the user device 102 may include a digital set-top box, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like.

In some embodiments, a cache prioritization module 106 and/or a content delivery module 108 may receive the request for the media content 104. The cache prioritization module 106 may include any suitable computing device capable of receiving and/or generating data including, but not limited to, a remote server or servers, a desktop computer, a laptop computer, a workstation, a cloud-based computing environment, resource, platform, or service, a distributed system, or the like.

In some embodiments, the cache prioritization module 106 may receive the request for the media content 104 from the user device 102 over one or more communication networks. In some embodiments, the media content 104 may be segmented into two or more content fragments 110. As depicted in FIG. 1, the media content 104 may be segmented into a first fragment $F_1$, a second fragment $F_2$, a third fragment $F_3$, a fourth fragment $F_4$, a fifth fragment $F_5$, and so on. While depicted as having a particular number of fragments for ease of illustration, it is understood that the media content 104 may be segmented into any number of fragments.

In some embodiments, the cache prioritization module 106 may determine a cache priority 112 for one or more of the fragments 110. In some embodiments, the cache priority 112 for a particular fragment changes based on the current state of the playback device (e.g., the user device 102) and/or the cache prioritization module 106 and inputs to the playback device. The primary independent variables for cache prioritization relating to the internal state of the playback device may include the current playhead position and the position of the requested segment in the timeline of a linear playback. In other words, the cache priority 112 for a particular fragment may dynamically change, for example, in response to the progression of a playhead 114 during playback.

In some embodiments, the cache priority 112 may be based on a current position of the playhead 114. The playhead 114 may include, for example, a visual indication in a user interface of the user device 102 depicting the current frame position in a linear playback of the media content 104. In some embodiments, the playhead 114 may be moved or otherwise repositioned using the user interface to force the user device 102 to request and display specific portions of the media content 104. For example, a user may use the user interface to drag the playhead 114 to a later portion of the media content 104 to immediately force the playback to jump to the later portion.

In some embodiments, as the playhead 114 gets closer to the position of a soon-to-be-requested segment, the priority of that segment increases. For example, the cache priority 112 of the fragment $F_1$ depicted in FIG. 1 may be increased due to the fragment $F_1$ being at the location of the playhead 114. Conversely, in some embodiments, after the content has been played, the priority of that fragment decreases.

In some embodiments, the cache priority 112 is inversely related to a garbage collection priority. For example, a decrease in cache priority may correspond to an increase in priority for garbage collection. Similarly, a fragment having a relatively high cache priority may have a relatively low garbage collection priority. In this manner, a memory allocation or other resource of the user device 102 may be optimized.

In some embodiments, the cache priority 112 may be based on a feature set of a user interface (e.g., a playback device) of the user device 102. In some embodiments, for example, a user interface of the user device 102 enables a user to skip certain content. This content may include, but is not limited to, recaps, introductions, end credit sequences, and/or advertisements. In some embodiments, the cache prioritization module 106 may account for the user interface allowing a particular content type to be skipped by lowering the priority of fragments associated with that content type. For example, the cache prioritization module 106 may lower the priority of fragments associated with an end credit sequence.

In some embodiments, the default prioritization may be dynamically augmented to increase the comparability between segment prioritization and customer preferences. In other words, the cache prioritization module 106 may take into account one or more individualized customer preferences and may increase the caching priority for fragments corresponding to preferred content. For example, the cache prioritization module 106 may lower the priority of fragments associated with an end credit sequence if a user account associated with the user device 102 (e.g., a user account currently signed into during the playback) has previously skipped an end credit sequence during one or more playbacks.

In some embodiments, the cache priority 112 for a fragment, which linearly follows the playhead 114 with respect to the standard linear playback of the content, may be lower than a later fragment. Such a nonlinear prioritization approach can decrease playback latency when the customer chooses to skip to the later fragment that has been cached due to the nonlinear prioritization rules.

In some embodiments, the playback system supports auxiliary content that is not required for the fundamental operation of the system, but which provides for a more fully-featured product. In some embodiments, the cache prioritization module 106 can take into account customer preferences with respect to the auxiliary features. For example, in a playback system which supports video asset previews through a separate resource, the acquisition of the separate resource may be independently prioritized by the cache prioritization module 106 to optimize the overall product experience. In other words, the cache prioritization module 106 may increase or decrease the cache priority 112 of the fragments associated with an auxiliary content. Similarly, catalog metadata assets, such as for actor, trivia, character information, and other related resources (e.g., actor photos), can be prioritized or deprioritized based on customer preferences. For example, the cache prioritization module 106 may increase the priority of fragments associated with one or more types of content metadata if a user account associated with the user device 102 (e.g., a user account currently signed into during the playback) has previously, or consistently (e.g., as compared to a threshold requirement), viewed that type of metadata.

In some embodiments, the playback system supports a chaptering system, where there are pre-selected common seek points corresponding to the beginning of each chapter. In some embodiments, each chapter contains a portion (e.g., five minutes) of the media content 104 (e.g., a two-hour long movie). In some embodiments, the length of each chapter may be the same, or may be different, depending on the media content 104. In some embodiments, the cache prioritization module 106 may increase the priority fragments that are positioned at the start of a new chapter. In some embodiments, a threshold may be manually or automatically set to determine whether a fragment is sufficiently close to the start of a new chapter to trigger an increase in the cache priority 112. For example, the first fragment, or the first three fragments, following the start of a new chapter may be assigned a higher priority.

In some embodiments, the cache prioritization module 106 may increase the cache priority of particular segments based on the specifics of the user interface or user interactions with the user interface. For example, if the video playback application used by the user device 102 provides for default seek forward or backward increments, fragments that correspond to such seek locations may have increased priority. In some embodiments, this process may be extended to encompass multiple potential sequential seeks, such that the cache priority 112 of a segment which is positioned at a multiple of the seek increment with respect to the current playhead 114 position is increased. For example, as depicted in FIG. 1, the fourth fragment $F_4$ is positioned one default seek duration 116 (also referred to as a seek increment) from the current position of the playhead 114. As a consequence, the cache priority 112 for the fourth fragment $F_4$ is increased. In some embodiments, the cache priority 112 for the fourth fragment $F_4$ is greater than the cache priority 112 for the second fragment $F_2$, even though the second fragment $F_2$ linearly follows the current position of the playhead 114.

In some embodiments, the video playback application of the user device 102 provides for the ability to seek content via a seekbar, and users are able to interact with the seekbar without immediately seeking. For example, a user may be able to position a mouse to hover over a position on the seekbar. In another example, a touch-based input system may process a seek request only after a user releases the seekbar. In either case, the cache prioritization module 106 may increase the cache priority 112 of one or more fragments indicated during the user's interaction with the seekbar. In other words, the cache prioritization module 106 may increase a priority of a fragment associated with a projected seek command, even prior to that command being issued.

In some embodiments, the cache prioritization module 106 may increase the cache priority 112 of particular segments based on known information about the media content 104. For example, if the media content 104 includes one or more known popular scenes, the cache prioritization module 106 may take into account the popularity/preference of the scenes when determining the cache priority 112. In some embodiments, the popularity/preference of each scene associated with the media content 104 is derived from viewing metrics from one or more previous viewings of the media content 104. For example, if a large number (e.g., as compared to a predetermined threshold) of users skip to a particular scene associated with the media content 104, the cache prioritization module 106 may increase the cache priority 112 of one or more fragments associated with that particular scene. Conversely, if a large number (e.g., as compared to a predetermined threshold) of users skip a particular scene, the cache prioritization module 106 may decrease the cache priority 112 of one or more fragments associated with that particular scene. In some embodiments, a scene popularity/preference may dynamically change in response to a current user seeking to one or more scenes.

In some embodiments, the cache prioritization module 106 may continuously or periodically generate a fragment prioritization 118. In some embodiments, the fragment prioritization 118 may be transmitted to, and received by, the content delivery module 108. The fragment prioritization 118 may include, for example, one or more fragment-cache priority pairs. In some embodiments, the fragment prioritization 118 may indicate one or more fragments for prioritized caching.

In some embodiments, the content delivery module 108 may retrieve one or more prioritized fragments 120 from a fragment database 122. The content delivery module 108 and the fragment database 122 may include any suitable computing device capable of receiving and/or generating data including, but not limited to, a remote server or servers, a desktop computer, a laptop computer, a workstation, a cloud-based computing environment, resource, platform, or service, a distributed system, or the like. In some embodiments, the fragment database 122 may be incorporated within the content delivery module 108. As depicted in FIG. 1, the content delivery module 108 requests, and receives, the first fragment $F_1$ and the fourth fragment $F_4$ from the fragment database 122, based on the fragment prioritization 118 according to one or more embodiments.

In some embodiments, the content delivery module 108 transmits the one or more prioritized fragments 120 (e.g., the first fragment $F_1$ and the fourth fragment $F_4$) to the user device 102 for local playback. In some embodiments, the one or more prioritized fragments 120 are temporarily stored on a memory device of the user device 102 prior to playback.

To nonlinearly prioritize content fragments for caching segmented content, an example process flow 150 is presented and may be performed, for example, by the user device 102, the cache prioritization module 106, and/or the content delivery module 108. In some embodiments, the user device 102, the cache prioritization module 106, and the content delivery module 108 may each include at least one memory that stores computer-executable instructions and at least one processor configured to access the at least one memory and execute the computer-executable instructions to perform various actions or operations, such as one or more of the operations in the process flow 150 of FIG. 1.

At a first block 152, a user device (e.g., a media player) may request media content (e.g., the media content 104) comprising fragments 110. The request for the media content may be received by the cache prioritization module 106 according to one or more embodiments. The media content may be segmented into one or more fragments.

At block 154, the media content fragments may be prioritized by the cache prioritization module 106 according to one or more embodiments. In some embodiments, cache prioritization may be based on a current position of a playhead 114 and a position of a fragment with respect to a linear playback of the media content. In some embodiments, as the playhead 114 gets closer to the position of a soon-to-be-requested segment, the priority of that segment increases.

In some embodiments, the cache priority 112 may be based on a feature set of a user interface (e.g., a playback device) of the user device 102. In some embodiments, the cache prioritization module 106 may account for the user interface allowing a particular content type to be skipped by lowering the priority of fragments associated with that content type. For example, the cache prioritization module 106 may lower the priority of fragments associated with an end credit sequence. In some embodiments, the cache prioritization module 106 may take into account one or more individualized customer preferences and may increase the caching priority for fragments corresponding to preferred content. In some embodiments, the cache prioritization module 106 can take into account customer preferences with respect to the auxiliary features, such as metadata (e.g., actor photos).

In some embodiments, the cache prioritization module 106 may increase the cache priority of particular segments based on the specifics of the user interface or user interactions with the user interface. In some embodiments, the cache prioritization module 106 may increase the priority fragments that are positioned at the start of a new chapter when a user interface supports chaptering. In some embodiments, such as when the video playback application used by a user device during playback provides for default seek forward or backward increments, fragments that correspond to such seek locations may have increased priority. In some embodiments, the cache prioritization module 106 may increase the cache priority 112 of one or more fragments indicated during the user's interaction with a seekbar. In some embodiments, the cache prioritization module 106 may take into account the popularity/preference of the scenes when determining the cache priority 112. In some embodiments, the cache prioritization module 106 may generate a fragment prioritization 118 defining one or more cache priorities. For example, the fragment prioritization 118 may indicate a next fragment for caching (e.g., a fragment having a highest current cache priority 112).

At block 156, an indication identifying one or more prioritized fragments 120 may received by the content delivery module 108. In some embodiments, the indication is included within the fragment prioritization 118. In some embodiments, the content delivery module 108 retrieves one or more prioritized fragments 120 from the fragment database 122 in response to receiving the indication. In some embodiments, the content delivery module 108 caches the one or more prioritized fragments 120.

At block 158, the content delivery module 108 may transmit the one or more prioritized fragments 120 to the user device 102 for playback. In some embodiments, the one or more prioritized fragments 120 are locally stored on a memory device of the user device 102 until required during playback. In some embodiments, the cache priority 112 of the one or more prioritized fragments 120 locally stored on the memory device of the user device 102 may change, such as, for example, in response to the progression of the playhead 114 during playback.

In some embodiments, the one or more prioritized fragments 120 may be replaced by one or more new fragments having a higher cache priority 112, according to one or more embodiments. For example, if a buffer (e.g., a defined cache size) for the user device 102 is limited, and there is not sufficient room for a new prioritized fragment, the user device 102 may delete or otherwise remove one or more previously cached fragments to make room for the new prioritized fragment. In some embodiments, a currently cached fragment having the currently lowest cache priority is selected for removal from the cache.

Example embodiments of the disclosure provide a number of technical features or technical effects. For example, certain embodiments of the disclosure may nonlinearly prioritize the caching of the two or more fragments of a media file in response to a request for the media file, cache the prioritized fragments for download and consumption and, in systems where storage and memory systems are constrained, utilize the same prioritization system for optimized garbage collection. In some embodiments, a reduction of bandwidth used by the media player may be realized due to the system more accurately predicting customer behavior (e.g., fragment selection) and preventing the download of unused fragments/content. In some embodiments, reduced playback latency may be provided due to the system accurately prioritizing expected preferred content over fragments that linearly follow the current fragment, ensuring that the preferred content is locally available when needed. In some embodiments, a memory footprint of a system or a device may be reduced by optimizing memory de-allocation using the same prioritization scheme (albeit reversed).

Embodiments of the disclosure may improve the delivery of media content to consumers by allowing for the dynamic, nonlinear caching of content fragments during, for example, a video playback. In some embodiments, a first fragment may be prioritized over a second fragment even though the first fragment occurs after the second fragment in a linear playback of the media content. Such a nonlinear prioritization scheme improves the consumer viewing experience by dynamically predicting which fragments will be required next and ensuring that those content fragments are cached and available. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
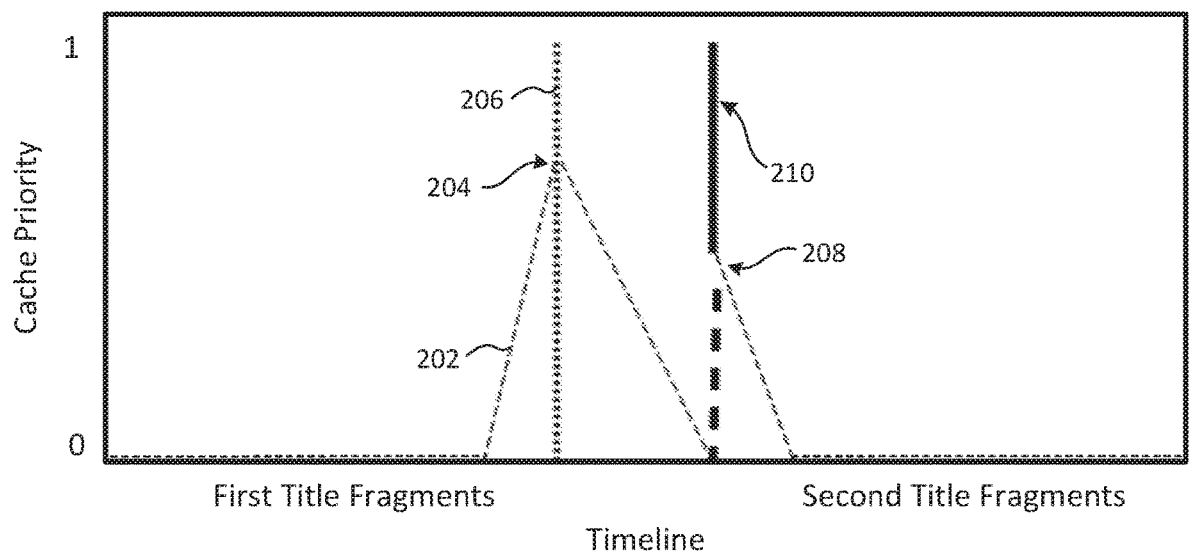
FIG. 2 is a schematic illustration of a nonlinear prioritization of the start of a second title when the playhead approaches during a multiple title playback in accordance with one or more example embodiments of the disclosure.

FIG. 2 schematically illustrates an exemplary graph 200 depicting a nonlinear prioritization of the start of a second title when the playhead approaches during a multiple title playback in accordance with one or more example embodiments of the disclosure. As discussed previously herein, a nonlinear prioritization scheme may improve the customer viewing experience by reducing jitter during playback.

As illustrated in FIG. 2, the graph 200 includes a cache priority 202 for a multiple title playback having a first title and a second title. As discussed previously herein, the first title and the second title may be segmented into a series of fragments that are sequentially played during a linear playback. As further illustrated in FIG. 2, the cache priority 202 increases from approximately zero (e.g., low or no cache priority) to a maximum priority 204 at the position of the playhead 206, before decreasing back to approximately zero for fragments sufficiently ahead of the playhead 206. While depicted as a piecewise linear function for ease of illustration, it is understood that the cache priority 202 may be based on a nonlinear function according to one or more embodiments. In other words, the cache priority 202 of fragments near the playhead 206 may be skewed to be relatively lower or higher in priority, and the rate at which the cache priority 202 decreases for fragments further away from the playhead 206 may or may not be constant.

In some embodiments, the rate at which the cache priority 202 decreases for fragments behind the playhead 206 is different from the rate at which the cache priority 202 decreases for fragments ahead of the playhead 206. For example, as depicted in FIG. 2, the cache priority 202 decreases at a higher rate for fragments which are before the playhead 206 (e.g., the slope of the line of the cache priority 202 may be steeper for fragments which are prior to the playhead 206 than fragments which are after the playhead 206). In this manner, the cache priority 202 may account for the increased likelihood of seeking to previously unviewed portions of the video playback rather than to those portions that already occurred.

As further illustrated in FIG. 2, the cache priority 202 for fragments 208 near the beginning 210 of the second title may dynamically increase as the playhead 206 approaches. In other words, the cache priority 202 for the fragments 208 may be higher than the cache priority 202 for some fragments of the first title that are after the playhead 206. As depicted in FIG. 2, the cache priority 202 decreases for fragments of the first title following the playhead 206 before rapidly increasing for the fragments 208 near the beginning 210 of the second title. In this manner, the cache priority 202 may account for the increased likelihood of skipping the end of the first title (e.g., a credits sequence) in favor of starting the second title early.

In some embodiments, the graph 200 may be leveraged to determine a nonlinear prioritization of content fragments according to one or more embodiments. For example, the data in the graph 200 may be used by the cache prioritization module 106 and/or the content delivery module 108 depicted in FIG. 1.

Figure 3:
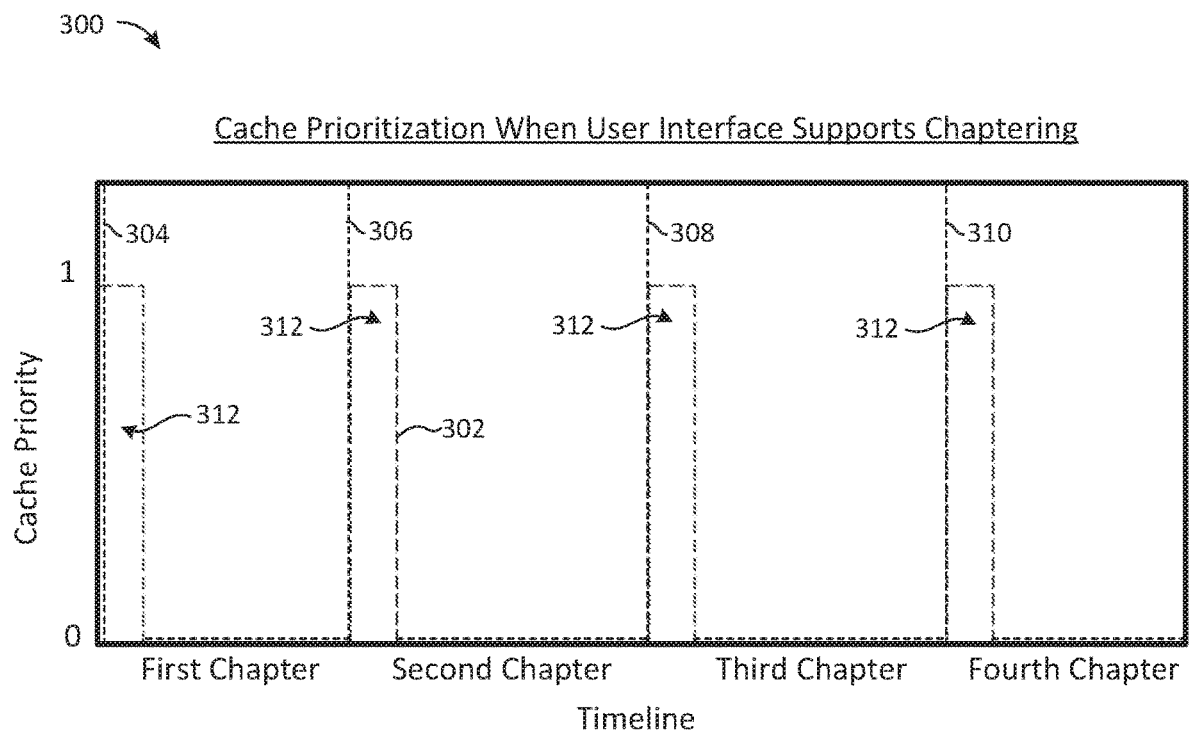
FIG. 3 is a schematic illustration of a nonlinear prioritization of fragments near the start of each chapter of a title during a playback when using a user interface that supports chaptering in accordance with one or more example embodiments of the disclosure.

FIG. 3 schematically illustrates an exemplary graph 300 depicting a nonlinear prioritization of fragments near the start of each chapter of a title during a playback when using a user interface that supports chaptering in accordance with one or more example embodiments of the disclosure. As discussed previously herein, a nonlinear prioritization scheme may improve the customer viewing experience by reducing jitter during playback.

As illustrated in FIG. 3, the graph 300 includes a cache priority 302 during playback when using a user interface that supports chaptering according to one or more embodiments. As depicted, the media playback includes a first chapter starting at a position 304, a second chapter starting at a position 306, a third chapter starting at a position 308, and a fourth chapter starting at a position 310, with respect to a linear playback of the title. While each chapter is depicted as having a similar share of the overall length of the title, it is understood that the chaptering system may include any number of chapters having arbitrary lengths.

As further illustrated in FIG. 3, the cache priority 302 may increase for fragments 312 near the starting positions 304, 306, 308, and 310 of the chapters. In some embodiments, the cache priority 302 decreases to approximately zero (e.g., low or no cache priority) for fragments that are not positioned near the start of a chapter. In some embodiments, a position of a fragment may be compared to a threshold to determine whether the fragment is sufficiently close to the start of a chapter to trigger an increased prioritization. The threshold may be manually or automatically set. In some embodiments, the threshold is set to a predetermined percentage or number of fragments following the start of each chapter. For example, the threshold may be set to increase the prioritization of the first fragment, or first three fragments, following the start of a new chapter.

While the start of each chapter is depicted as have a same, maximum caching prioritization for ease of illustration, it is understood that the prioritization of each chapter may be different. For example, in some embodiments, fragments near the beginning of a chapter nearest to the current position of a playhead may have a higher priority than fragments near the beginning of more remote chapters. In some embodiments, fragments near the beginning of popular chapters may have a higher priority than fragments near the beginning of less popular chapters. In some embodiments, the popularity of a chapter may be based on viewing metrics such as, but not limited to, a number or percentage of previous views of the title, by the current user device or user account or in an aggregate of some or all of the previous views of the title, which included a user-initiated seek to the chapter. In other words, chapters that are more frequently skipped may have a lower priority, while chapters that are often skipped to may have a higher priority.

In some embodiments, the graph 300 may be leveraged to determine a nonlinear prioritization of content fragments according to one or more embodiments. For example, the data in the graph 300 may be used by the cache prioritization module 106 and/or the content delivery module 108 depicted in FIG. 1.

Figure 4:
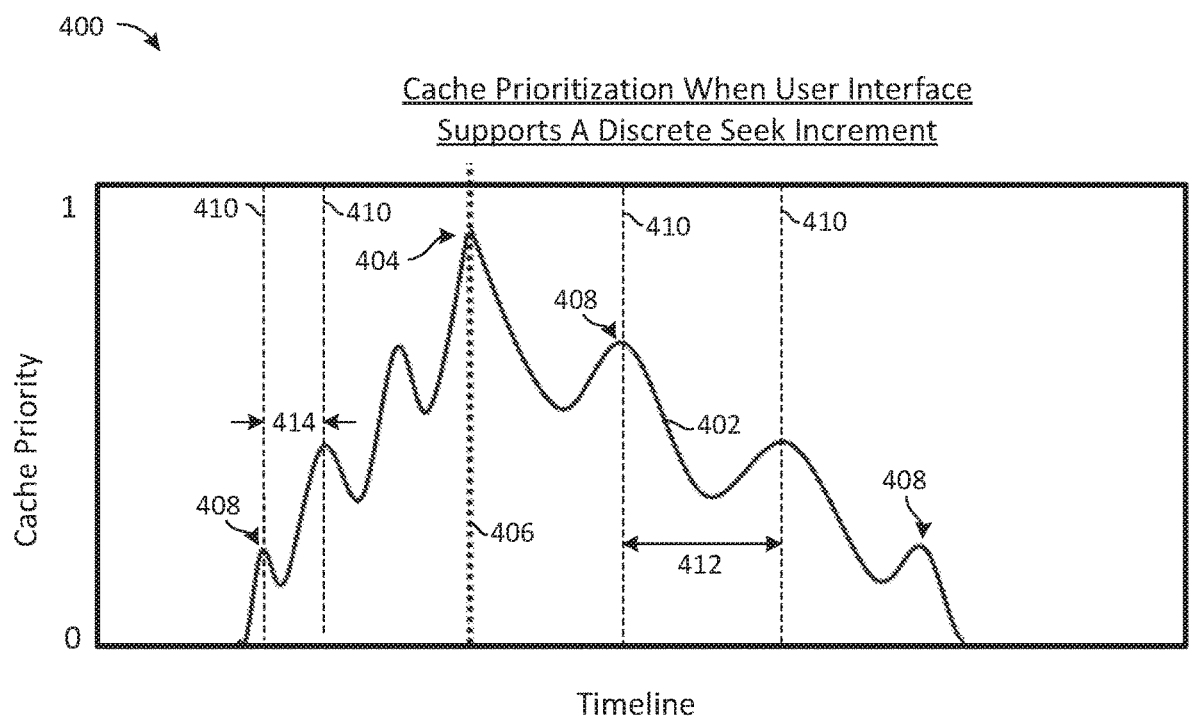
FIG. 4 is a schematic illustration of an example process illustrating a nonlinear prioritization of fragments near seek points during a playback when using a user interface that supports discrete seek increments in accordance with one or more example embodiments of the disclosure.

FIG. 4 schematically illustrates an exemplary graph 400 depicting a nonlinear prioritization of fragments near seek points during a playback when using a user interface that supports discrete seek increments in accordance with one or more example embodiments of the disclosure. As discussed previously herein, a nonlinear prioritization scheme may improve the customer viewing experience by reducing jitter during playback.

As illustrated in FIG. 4, the cache priority 402 increases from approximately zero (e.g., low or no cache priority) to a maximum priority 404 at the position of the playhead 406. In some embodiments, the rate at which the cache priority 402 decreases for fragments behind the playhead 406 is different from the rate at which the cache priority 402 decreases for fragments ahead of the playhead 406. For example, as depicted in FIG. 4, the cache priority 402 decreases at a higher rate for fragments which are prior to the playhead 406 (e.g., the average slope of the line of the cache priority 402 may be steeper for fragments which are prior to the playhead 406 than fragments which are after the playhead 406). In this manner, the cache priority 402 may account for the increased likelihood of seeking to previously unviewed portions of the video playback rather than to those portions that already occurred.

As further illustrated in FIG. 4, the cache priority 402 may increase to a local maximum 408 for fragments near a seek point 410. In some embodiments, the seek points 410 are evenly spaced through the playback. In other words, a seek distance between successive pairs of seek points may be equal. For example, a number of fragments or a playback time between successive pairs of seek points may be equal. In some embodiments, the seek points 410 are not equally spaced. For example, a first seek increment 412 may be larger than a second seek increment 414. In some embodiments, the first seek increment 412 is associated with a forward seek (e.g., seeking to fragments which linearly follow the playhead 406). In some embodiments, the second seek increment 414 is associated with a backward seek (e.g., seeking to fragments which linearly precede the playhead 406).

In some embodiments, the cache priority 402 decreases for fragments that are not positioned near a seek point 410. In some embodiments, the cache priority 402 decreases for fragments that are not positioned near the playhead 406. In some embodiments, the cache priority 402 decreases for fragments as a function of both a distance from a seek point 410 and a distance from the playhead 406 according to one or more embodiments.

In some embodiments, a position of a fragment may be compared to a threshold to determine whether the fragment is sufficiently close to a seek point 410 and/or the playhead 406 to trigger an increased prioritization. The threshold may be manually or automatically set. In some embodiments, the threshold is set to a predetermined percentage or number of fragments following a seek point 410 and/or the playhead 406. For example, the threshold may be set to increase the prioritization of a first fragment associated with or following a seek point 410.

The cache priority 402 may be based on a nonlinear function according to one or more embodiments. In other words, the cache priority 402 of fragments may be skewed to be relatively lower or higher in priority based on a number of factors, such as, but not limited to, proximity to the playhead, proximity to a seek point, or any other parameter according to one or more embodiments.

In some embodiments, the graph 400 may be leveraged to determine a nonlinear prioritization of content fragments according to one or more embodiments. For example, the data in the graph 400 may be used by the cache prioritization module 106 and/or the content delivery module 108 depicted in FIG. 1.

Figure 5:
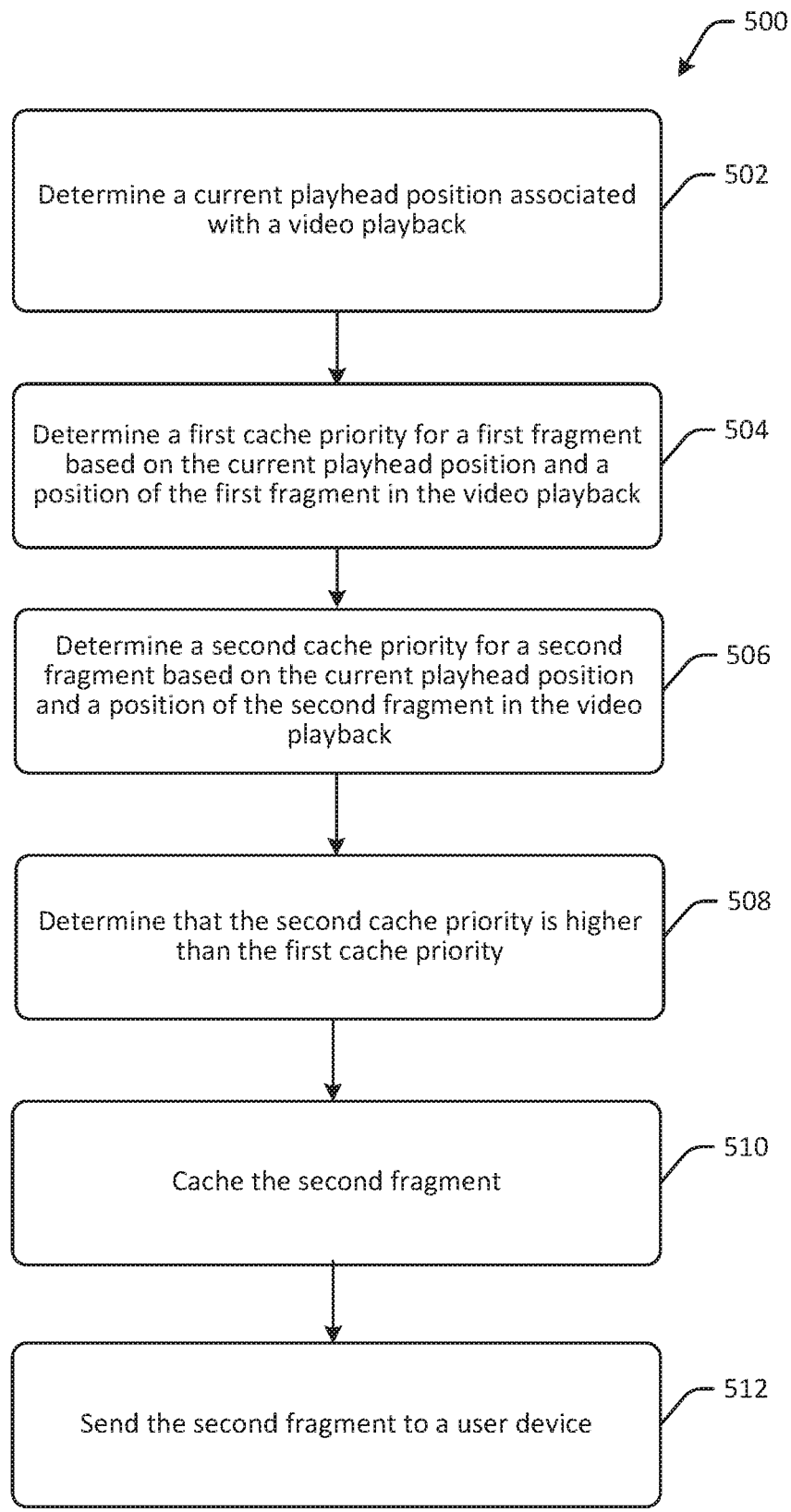
FIG. 5 is a schematic illustration of an example process flow for nonlinearly prioritizing fragments for caching in accordance with one or more example embodiments of the disclosure.

FIG. 5 schematically illustrates an example use case and an example process flow 500 for nonlinearly prioritizing fragments for caching in accordance with one or more example embodiments of the disclosure. Some or all of the blocks of the process flow 500 may be performed in a distributed manner across any number of devices. The operations of the process flow 500 may be optional and may be performed in a different order.

At block 502, a current playhead position associated with a video playback may be determined. The current playhead position can be defined by a user interface of a user device, according to one or more embodiments, such as by a user interface of the user device 102 depicted in FIG. 1.

At block 504, a first cache priority may be determined for a first fragment based on the current playhead position and a position of the first fragment in the video playback. The first cache priority may be determined according to one or more embodiments, such as by the cache prioritization module 106 depicted in FIG. 1.

In some embodiments, the first cache priority dynamically changes based on the current state of the playback device, according to one or more embodiments. As discussed previously herein, the primary independent variables for cache prioritization relating to the internal state of the playback device may include the current playhead position and the position of a fragment in the timeline of linear playback. In other words, the first cache priority may dynamically change, for example, in response to the progression of the playhead during playback. For example, a priority associated with a particular fragment may increase as the playhead approaches, while a priority associated with the same fragment may decrease once the playhead passes.

At block 506, a second cache priority may be determined for a second fragment based on the current playhead position and a position of the second fragment in the video playback. The second cache priority may be determined in a similar manner as the first cache priority, according to one or more embodiments.

At block 508, a determination may be made that the second cache priority is higher than the first cache priority. In some embodiments, the determination is made notwithstanding the fact that the first fragment precedes the second fragment with respect to a linear playback of the media content. In other words, the first fragment may be positioned between the playhead and the second fragment.

In some embodiments, determining that the second cache priority is higher than the first cache priority includes determining a first content type associated with the first fragment and a second content type associated with the second fragment. The first and second content types may include, for example, an end credits sequence, a popular scene, an advertisement, an introduction, and/or a recap, although other content types are within the contemplated scope of the disclosure.

In some embodiments, determining that the second cache priority is higher than the first cache priority includes determining a preference for the second content type over the first content type. The preference may be based on one or more viewing metrics or customer preferences, according to one or more embodiments. For example, if a demographic associated with a user of the playback device is known to preferentially skip to a particular scene during playback, the cache priority of fragments associated with the particular scene may be prioritized.

In some embodiments, a default seek increment may be associated with the video playback. For example, a user interface of the playback device may support a default seek increment of 10 seconds. In other words, the user interface may be used to preferentially skip portions of the media content in 10-second increments, although other increments are within the contemplated scope of the disclosure. In some embodiments, determining the first and/or second cache priority is based on the default seek increment.

In some embodiments, an expected seek location may be determined based on the current playhead position and the default seek increment. For example, a fragment positioned 10 seconds (or increments of 10 seconds) ahead of the current playhead position may be prioritized. In some embodiments, a determination may be made that the position of the second fragment in the video playback corresponds to the expected seek location.

In some embodiments, a scene popularity associated with the first and/or second fragment may be determined according to one or more embodiments. In some embodiments, determining the first and/or second cache priority may be based on a scene popularity.

In some embodiments, the video playback application of the user device 102 provides for seeking via a seekbar and users are able to interact with the seekbar without immediately seeking. For example, a user may be able to position a mouse to hover over a position on the seekbar. In some embodiments, a cache priority of one or more fragments may be based on a user's interaction with the seekbar. In other words, the priority of a fragment associated with a projected seek command, even prior to that command being issued, may be increased. This may occur, for example, in response to receiving an indication to change the current playhead position from the seekbar (e.g., a mouse hover). In some embodiments, a future playhead position is estimated based on the indication. In some embodiments, the position of the second fragment in the video playback may correspond to the future playhead position.

In some embodiments, determining that the second cache priority is higher than the first cache priority includes determining a demographic associated with the video playback, according to one or more embodiments. In some embodiments, a preferred content type associated with the demographic is determined. In some embodiments, a determination is made that the second fragment corresponds to the preferred content type.

At block 510, the second fragment may be cached for faster retrieval. The second fragment may be cached according to one or more embodiments, such as by the content deliver module 108 depicted in FIG. 1. In some embodiments, the content deliver module 108 retrieves the second fragment from a local or remote database, such as the fragment database 122 depicted in FIG. 1.

At block 512, the second fragment may sent to a user device in anticipation of playback. In some embodiments, the second fragment is locally stored on a memory of the user device under required during playback, according to one or more embodiments. In this manner, a playback latency associated with a playback of the second fragment may be reduced. In some embodiments, the second fragment remains in the local storage of the user device until the second fragment is required for playback, or until the second fragment is replaced by a new fragment having a higher cache priority, according to one or more embodiments.

Figure 6:
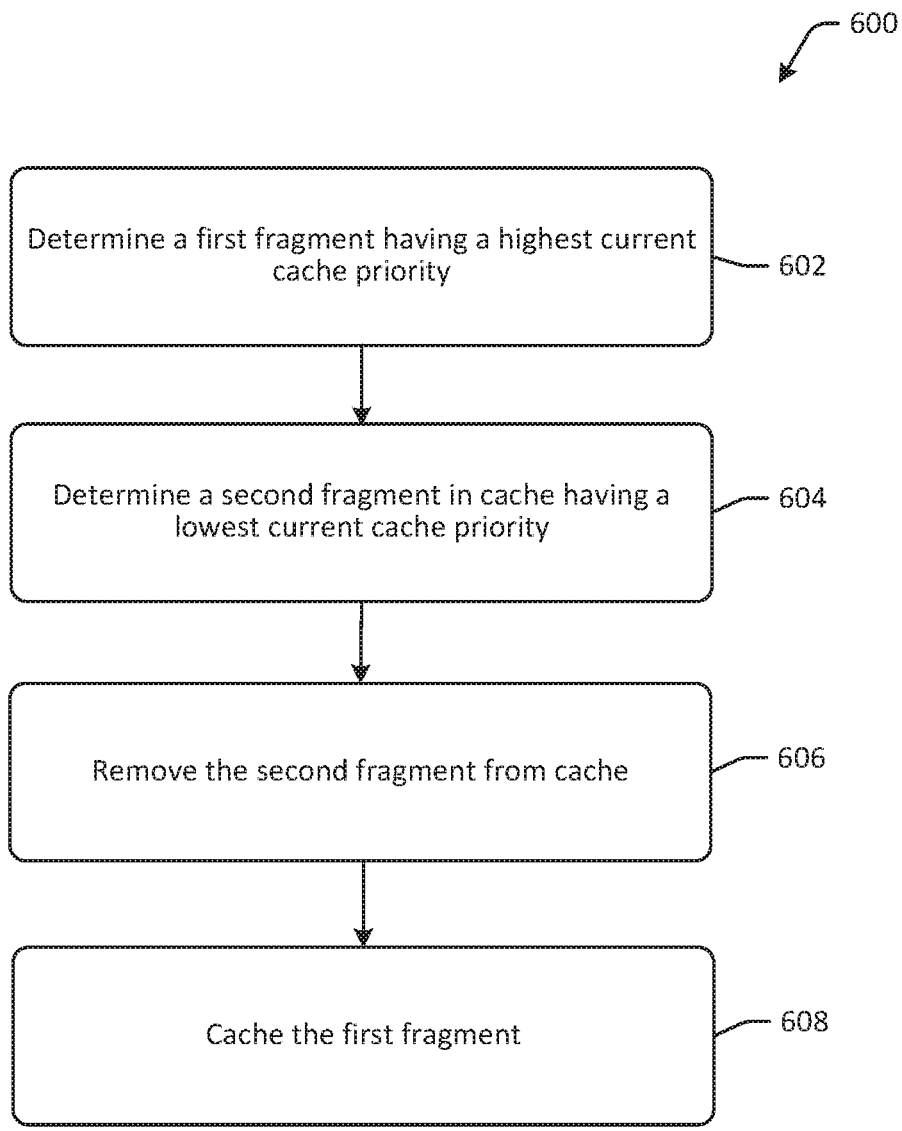
FIG. 6 is a schematic illustration of an example process for nonlinearly prioritizing fragments for caching and garbage collection in accordance with one or more example embodiments of the disclosure.

FIG. 6 schematically illustrates an example use case and an example process flow 600 for nonlinearly prioritizing fragments for caching and garbage collection in accordance with one or more example embodiments of the disclosure. Some or all of the blocks of the process flow 600 may be performed in a distributed manner across any number of devices. The operations of the process flow 600 may be optional and may be performed in a different order.

At block 602, a first fragment having a highest current cache priority may be determined. The first fragment and the highest current cache priority may be determined according to one or more embodiments, such as by the cache prioritization module 106 depicted in FIG. 1. In some embodiments, the cache priority may be determined based on the current playhead position, a position of the first fragment in linear playback of the media, and one or more nonlinear prioritization rules, according to one or more embodiments.

In some embodiments, the cache priority dynamically changes based on the current state of the playback device, according to one or more embodiments. In other words, the cache priority may dynamically change, for example, in response to the progression of the playhead during playback. For example, the cache priority of the first fragment may increase as the playhead approaches.

At block 604, a second fragment in cache having a lowest current cache priority may be determined. The second fragment and the lowest current cache priority may be determined according to one or more embodiments, such as by the cache prioritization module 106 depicted in FIG. 1. In some embodiments, the cache prioritization module 106 maintains a fragment priority for each of the fragments in the media. For example the fragment priorities may be stored in a fragment prioritization, such as the fragment prioritization 118 depicted in FIG. 1. In some embodiments, the cache may be searched for a fragment having a lowest current cache priority as indicated in the fragment prioritization.

At block 606, the second fragment is removed from cache. In some embodiments, the second fragment is removed to free memory or storage space for the first fragment. In this manner, the cache is dynamically monitored and adjusted to ensure that the currently highest priority fragments are readily available. In some embodiments, a buffer or other storage capacity of the cache is sufficient for both the first fragment and the second fragment. In some embodiments, the second fragment is only removed from cache if room is needed for the first fragment.

At block 608, the first fragment may be cached. In some embodiments, the first fragment may be cached by a content delivery module, such as the content delivery module 108 depicted in FIG. 1. In some embodiments, the first fragment is cached or locally stored on a user device, such as by the user device 102 depicted in FIG. 1.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art may recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 7:
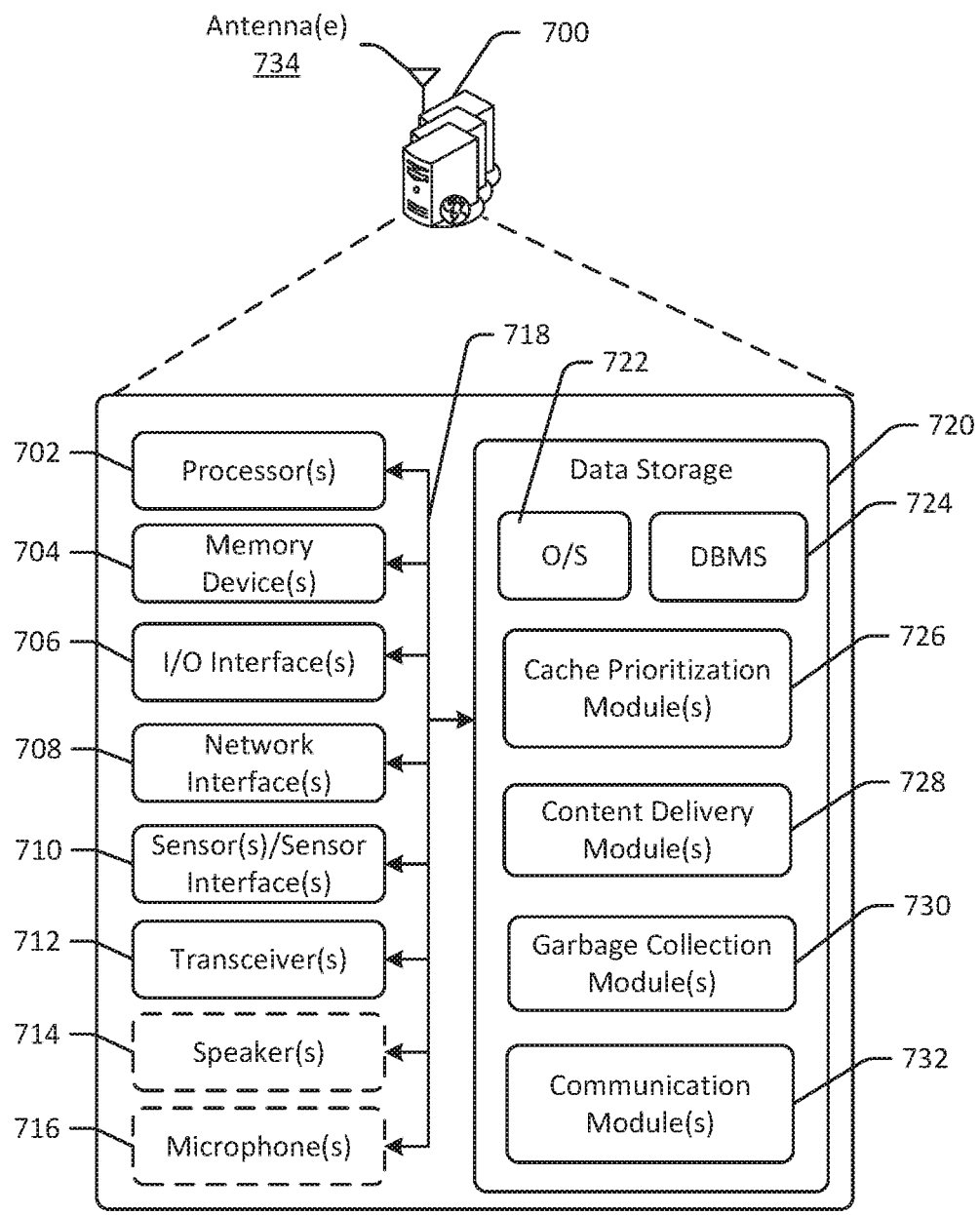
FIG. 7 is a schematic block diagram of an illustrative device in accordance with one or more example embodiments of the disclosure.

FIG. 7 is a schematic block diagram of an illustrative remote server 700 in accordance with one or more example embodiments of the disclosure. The remote server 700 may include any suitable computing device capable of receiving and/or generating data including, but not limited to, a remote system (e.g., the remote system 76 of FIG. 1), a super pseudo-live service (e.g., the super pseudo-live service 708 of FIG. 7) or the like. The remote server 700 may correspond to an illustrative device configuration for the devices of FIGS. 1-6.

The remote server 700 may be configured to communicate via one or more networks with one or more servers, search engines, user devices, or the like. In some embodiments, a single remote server or single group of remote servers may be configured to perform product collection generation, product collection surfacing, and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 700 may include one or more processors (processor(s)) 702, one or more memory devices 704 (generically referred to herein as memory 704), one or more input/output (I/O) interface(s) 706, one or more network interface(s) 708, one or more sensors or sensor interface(s) 710, one or more transceivers 712, one or more optional speakers 714, one or more optional microphones 716, and data storage 720. The remote server 700 may further include one or more buses 718 that functionally couple various components of the remote server 700. The remote server 700 may further include one or more antenna(e) 734 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit exchange of information (e.g., data (including computer-executable code), signaling, etc.) between various components of the remote server 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the remote server 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like such as, for example, one or more cache prioritization module(s) 726, one or more content delivery module(s) 728, one or more garbage collection module(s) 730, and one or more communication module(s) 732. Some or all of these module(s) may be sub-module(s). Any of the components depicted as being stored in data storage 720 may include any combination of software, firmware, and/or hardware. The software and/or firmware may include computer-executable code, instructions, or the like that may be loaded into the memory device(s) 704 for execution by one or more of the processor(s) 702. Any of the components depicted as being stored in data storage 720 may support functionality described in reference to correspondingly named components earlier in this disclosure.

The data storage 720 may further store various types of data utilized by components of the remote server 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, the datastore(s) may include, for example, threat intelligence data, whitelisted entity data, user account information, user profile information, machine learning models, historical accuracy data, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the remote server 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the cache prioritization module(s) 726 may include computer-executable instructions, code, or the like, that responsive to execution by one or more of the processor(s) 702 may perform functions including, but not limited to, nonlinearly prioritizing one or more fragments of a media file during playback, according to one or more embodiments. In some embodiments, the nonlinear prioritization of a fragment may be dynamically based on a current playhead position, the position of the fragment in a linear playback, and one or more nonlinear prioritization rules, according to one or more embodiments.

The content delivery module(s) 728 may include computer-executable instructions, code, or the like that responsive to execution by one or more of the processor(s) 702 may perform functions including, but not limited to, identifying a fragment having a highest current priority, retrieving the fragment from a local or remote database, caching the fragment, and/or transmitting the fragment to a playback device.

The garbage collection module(s) 730 may include computer-executable instructions, code, or the like that responsive to execution by one or more of the processor(s) 702 may perform functions including, but not limited to, determining whether the cache is sufficient to store a new prioritized fragment, identifying a currently cached fragment having a lowest current priority, and/or removing the fragment from cache, according to one or more embodiments.

The communication module(s) 732 may include computer-executable instructions, code, or the like that responsive to execution by one or more of the processor(s) 702 may perform functions including, but not limited to, communicating with one or more devices, for example, via wired or wireless communication, communicating with remote servers, communicating with remote datastores, sending or receiving notifications or alerts, communicating with cache memory data, and the like.

Referring now to other illustrative components depicted as being stored in the data storage 720, the O/S 722 may be loaded from the data storage 720 into the memory 704 and may provide an interface between other application software executing on the remote server 700 and hardware resources of the remote server 700. More specifically, the O/S 722 may include a set of computer-executable instructions for managing hardware resources of the remote server 700 and for providing common services to other application programs (e.g., managing memory allocation among various application programs). In certain example embodiments, the O/S 722 may control execution of the other program module(s) to dynamically enhance characters for content rendering. The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 700 is a mobile device, the DBMS 724 may be any suitable light-weight DBMS optimized for performance on a mobile device.

Referring now to other illustrative components of the remote server 700, the input/output (I/O) interface(s) 706 may facilitate the receipt of input information by the remote server 700 from one or more I/O devices as well as the output of information from the remote server 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(e) 734 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 700 may further include one or more network interface(s) 708 via which the remote server 700 may communicate with any of a variety of other systems, platforms, networks, devices, and so forth. The network interface(s) 708 may enable communication, for example, with one or more wireless routers, one or more host servers, one or more web servers, and the like via one or more of networks.

The antenna(e) 734 may include any suitable type of antenna depending, for example, on the communications protocols used to transmit or receive signals via the antenna (e) 734. Non-limiting examples of suitable antennas may include directional antennas, non-directional antennas, dipole antennas, folded dipole antennas, patch antennas, multiple-input multiple-output (MIMO) antennas, or the like. The antenna(e) 734 may be communicatively coupled to one or more transceivers 712 or radio components to which or from which signals may be transmitted or received.

As previously described, the antenna(e) 734 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 734 may additionally, or alternatively, include a Wi-Fi antenna configured to transmit or receive signals in accordance with established standards and protocols, such as the IEEE 752.11 family of standards, including via 2.4 GHz channels (e.g., 752.11b, 752.11g, 752.11n), 5 GHz channels (e.g., 752.11n, 752.11ac), or 60 GHz channels (e.g., 752.11ad). In alternative example embodiments, the antenna(e) 734 may be configured to transmit or receive radio frequency signals within any suitable frequency range forming part of the unlicensed portion of the radio spectrum.

The antenna(e) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(e) 734—transmitting or receiving radio frequency (RF) signals in the bandwidth and/or channels corresponding to the communications protocols utilized by the remote server 700 to communicate with other devices. The transceiver(s) 712 may include hardware, software, and/or firmware for modulating, transmitting, or receiving—potentially in cooperation with any of antenna(e) 734—communications signals according to any of the communications protocols discussed above including, but not limited to, one or more Wi-Fi and/or Wi-Fi direct protocols, as standardized by the IEEE 752.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the remote server 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 714 may be any device configured to generate audible sound. The optional microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the remote server 700 may include alternate and/or additional hardware, software, or firmware components beyond those described or depicted without departing from the scope of the disclosure. More particularly, it should be appreciated that software, firmware, or hardware components depicted as forming part of the remote server 700 are merely illustrative and that some components may not be present or additional components may be provided in various embodiments. While various illustrative program module(s) have been depicted and described as software module(s) stored in data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
receiving, by one or more computer processors coupled to at least one memory, a request for a media file from a user device during a video playback;
determining, by the one or more computer processors, a current playhead position associated with the video playback, wherein the current playhead position can be modified via a user interface comprising a seekbar;
determining, by the one or more computer processors, a first cache priority for a first fragment of the media file based on the current playhead position and a position of the first fragment in a linear playback of the media file, wherein the first fragment is a next fragment with respect to the current playhead position;
determining, by the one or more computer processors, a scene popularity associated with a second fragment;
determining, by the one or more computer processors, a second cache priority for the second fragment of the media file based on the current playhead position, a second playhead position associated with a position of the second fragment in the linear playback of the media file, and the scene popularity, wherein the first fragment is positioned between the first playhead position and the second fragment;
determining, by the one or more computer processors, a default seek increment associated with the video playback;
determining, by the one or more computer processors, a third cache priority for a third fragment of the media file based on (i) the default seek increment, (ii) the current playhead position, and (iii) a third playhead position associated with a position of the third fragment in the linear playback of the media file, wherein the third fragment follows the second fragment in the linear playback and the third fragment is associated with a default seek location, and wherein the second fragment is between the first fragment and the third fragment;
determining, by the one or more computer processors, that the third cache priority is higher than the first cache priority and the second cache priority based at least in part on a projected seek command associated with an indication to change the current playhead position to the second playhead position via the seekbar;
determining, by the one or more computer processors and based at least in part on the third cache priority, that the third fragment is to be cached instead of the first fragment and the second fragment;
caching, by the one or more computer processors, the third fragment; and
sending, by the one or more computer processors, the third fragment to the user device.

2. The method of claim 1, wherein determining that the third cache priority is higher than the first cache priority and the second cache priority further comprises:
determining, by the one or more computer processors, a first content type associated with the first fragment, a second content type associated with the second fragment, and a third content type associated with the third fragment; and
determining, by the one or more computer processors, a customer preference for the third content type over the first content type and the second content type.

3. A method comprising:
determining, by one or more computer processors coupled to at least one memory, a first playhead position associated with a video playback, wherein the first playhead position can be modified via a user interface comprising a seekbar;
determining, by the one or more computer processors, a first cache priority for a first fragment based on the first playhead position and a position of the first fragment in the video playback, wherein the first fragment is a next fragment with respect to the first playhead position;
determining, by the one or more computer processors, a default seek increment associated with the video playback, wherein a second fragment that is non-consecutive with respect to the first fragment is associated with the default seek increment;
determining, by the one or more computer processors, a second cache priority for the second fragment based on (i) the default seek increment, (ii) the first playhead position, and (iii) a second playhead position associated with a position of the second fragment in the video playback, wherein the first fragment is positioned between the first playhead position and the second fragment;
determining, by the one or more computer processors, that the second cache priority is higher than the first cache priority based at least in part on a projected seek command associated with an indication to change the first playhead position to the second playhead position via the seekbar;

determining, by the one or more computer processors and based at least in part on the second cache priority, that the second fragment is to be cached instead of the first fragment;

caching, by the one or more computer processors, the second fragment; and sending, by the one or more computer processors, the second fragment to a user device.

4. The method of claim 3, wherein determining that the second cache priority is higher than the first cache priority further comprises:

determining, by the one or more computer processors, a first content type associated with the first fragment and a second content type associated with the second fragment; and determining, by the one or more computer processors, a preference for the second content type over the first content type.

5. The method of claim 3, further comprising:

determining, by the one or more computer processors, an expected seek location based on the first playhead position and the default seek increment; and determining, by the one or more computer processors, that the position of the second fragment in the video playback corresponds to the expected seek location.

6. The method of claim 3, wherein determining that the second cache priority is higher than the first cache priority further comprises:

determining, by the one or more computer processors, a demographic associated with the video playback;

determining, by the one or more computer processors, a preferred content type based on the demographic; and determining, by the one or more computer processors, that the second fragment corresponds to the preferred content type.

7. A device comprising:

at least one memory that stores computer-executable instructions; and at least one processor configured to access the memory and execute the computer-executable instructions to:

determine a first playhead position associated with a video playback, wherein the first playhead position can be modified via a user interface comprising a seekbar;

determine a first cache priority for a first fragment based on the first playhead position and a position of the first fragment in the video playback, wherein the first fragment is a next fragment with respect to the first playhead position;

determine a default seek increment associated with the video playback, wherein a second fragment that is non-consecutive with respect to the first fragment is associated with the default seek increment;

determine a second cache priority for the second fragment based on (i) the default seek increment, (ii) the first playhead position, and (iii) a second playhead position associated with a position of the second fragment in the video playback, and the scene popularity, wherein the first fragment is positioned between the first playhead position and the second fragment;

determine that the second cache priority is higher than the first cache priority based at least in part on a projected seek command associated with an indication to change the first playhead position to the second playhead position via the seekbar;

determine, based at least in part on the second cache priority, that the second fragment is to be cached instead of the first fragment;

cache the second fragment; and send the second fragment to a user device.

8. The device of claim 7, wherein the at least one processor is further configured to:

determine a first content type associated with the first fragment and a second content type associated with the second fragment; and determine a preference for the second content type over the first content type.

9. The device of claim 7, wherein the at least one processor is further configured to:

determine an expected seek location based on the first playhead position and the default seek increment; and determine that the position of the second fragment in the video playback corresponds to the expected seek location.

10. The device of claim 7, wherein the at least one processor is further configured to:

determine a demographic associated with the video playback;

determine a preferred content type based on the demographic; and determine that the second fragment corresponds to the preferred content type.

* * * * *